United States Patent
Das et al.

(10) Patent No.: US 7,647,423 B2
(45) Date of Patent: Jan. 12, 2010

(54) WORKFLOW BASED AND METADATA DRIVEN REPORTING SYSTEM

(75) Inventors: Shubhendu Das, Edison, NJ (US); Mark Walbaum, Norwalk, CT (US); Amit Goel, Lisle, IL (US)

(73) Assignee: Morgan Stanley, New York, NY (US)

( * ) Notice: Subject to any disclaimer, the term of this patent is extended or adjusted under 35 U.S.C. 154(b) by 334 days.

(21) Appl. No.: 11/119,008

(22) Filed: Apr. 29, 2005

(65) Prior Publication Data

US 2008/0034055 A1  Feb. 7, 2008

(51) Int. Cl.
*G06F 15/173* (2006.01)
*G06F 15/17* (2006.01)

(52) U.S. Cl. .................... 709/238; 709/223; 709/217

(58) Field of Classification Search ............... 707/3; 709/217, 225, 226, 227, 228, 229, 230, 238; 715/513
See application file for complete search history.

(56) References Cited

U.S. PATENT DOCUMENTS

| | | | |
|---|---|---|---|
| 5,535,322 A | 7/1996 | Hecht | |
| 6,279,033 B1 | 8/2001 | Selvarajan et al. | |
| 6,377,993 B1 | 4/2002 | Brandt et al. | |
| 6,385,644 B1 | 5/2002 | Devine et al. | |
| 6,453,317 B1 * | 9/2002 | LaCost et al. | 707/10 |
| 6,584,466 B1 | 6/2003 | Serbinis et al. | |
| 6,631,402 B1 | 10/2003 | Devine et al. | |
| 6,668,253 B1 | 12/2003 | Thompson et al. | |
| 6,714,979 B1 | 3/2004 | Brandt et al. | |
| 6,772,137 B1 | 8/2004 | Hurwood et al. | |
| 6,826,534 B1 | 11/2004 | Gupta et al. | |
| 6,993,533 B1 | 1/2006 | Barnes | |
| 7,051,038 B1 * | 5/2006 | Yeh et al. | 707/102 |
| 7,152,200 B2 * | 12/2006 | Albert et al. | 715/234 |
| 7,242,324 B2 * | 7/2007 | Lai et al. | 341/51 |
| 2003/0200503 A1 | 10/2003 | Koppich et al. | |
| 2003/0233366 A1 | 12/2003 | Kesselman et al. | |
| 2004/0006570 A1 * | 1/2004 | Gelb et al. | 707/102 |
| 2004/0093377 A1 | 5/2004 | Lumera et al. | |
| 2004/0193657 A1 | 9/2004 | Saito et al. | |
| 2005/0034055 A1 | 2/2005 | Rangan et al. | |
| 2005/0039033 A1 | 2/2005 | Meyers et al. | |
| 2005/0198073 A1 | 9/2005 | Becks et al. | |

(Continued)

*Primary Examiner*—Karen C Tang
(74) *Attorney, Agent, or Firm*—K&L Gates LLP

(57) ABSTRACT

A flexible metadata driven and workflow based report generation system is disclosed. According to various embodiments, the system comprises at least one client application on a client terminal and a report manager system. The client application allows a user to run a report from a user interface having the flexibility to choose various parameters that affect the content of the generated report. The report manager system comprises a metadata service and a workflow controller service. The metadata service is for retrieving report metadata (report name, parameter(s) and their parameter values) to be displayed on the user interface to allow the user to choose parameter values and run a report job. The controller is for receiving messages from the client terminal upon submission of a report job and, based on the received messages, sending messages to one or more service components for executing the report job in a sequence of determined discrete steps. A report workflow defines the steps to be invoked in the execution of a report and is stored in tables in a database accessible via the metadata service. The services components may include data accessors, formatting services, language translation services, bundling services, distribution services and/or scheduling services.

18 Claims, 12 Drawing Sheets

U.S. PATENT DOCUMENTS

| | | |
|---|---|---|
| 2006/0004842 A1 | 1/2006 | Wu et al. |
| 2006/0010156 A1 | 1/2006 | Netz et al. |
| 2006/0026122 A1 | 2/2006 | Hurwood et al. |
| 2006/0048050 A1* | 3/2006 | Cox et al. .................. 715/513 |
| 2006/0048096 A1 | 3/2006 | Jiang et al. |
| 2006/0069628 A1 | 3/2006 | Le et al. |
| 2006/0080289 A1 | 4/2006 | Brunswig et al. |
| 2006/0143220 A1* | 6/2006 | Spencer ..................... 707/102 |
| 2007/0038348 A1* | 2/2007 | Larschan et al. .............. 701/35 |

\* cited by examiner

WORKFLOW BASED AND METADATA DRIVEN REPORTING SYSTEM

BACKGROUND

The present invention generally concerns information technology systems and, more particularly, systems for generating, formatting, scheduling, packaging, and distributing reports or extracts (data feeds).

The financial services industry relies heavily on reports and reporting services/systems as an important medium for communicating with clients and potential clients. The reports might communicate time critical information about investments, including a fund/portfolio performance, present market value, a summary of gains/losses, and other information in a user-friendly way.

The typical challenge faced by designers of large scale enterprise reporting systems in the financial services industry is trying to integrate a mixture of commercial vendor applications with home grown applications so that reporting can be done in flexible and scalable ways. Other challenges relate to licensing and scalability. Such reporting applications can range from ordinary spreadsheet based applications, to exclusive vendor report formatting applications (e.g., Crystal reports), to in-house applications. Such multi-application, multi-vendor approaches can be expensive, inflexible, and difficult to administer and maintain. Accordingly, an improved system is needed.

SUMMARY

In one general aspect, various embodiments of the present invention are directed to an enterprise-level, metadata-driven, workflow-based reporting system for generating and managing reports. A report is an organized collection of data formatted for viewing or printing in a user-friendly way. According to various embodiments, the system includes a report manager system (RMS) in communication with a number of client applications running on user terminals. The client terminals may use a flexible, metadata-driven client (front-end) application (internet based or not) that allows users to choose a set of reports from a menu driven interface. The system entitlements allow different people/groups to view their own view of allowed reports. For one or multiple reports chosen, the interface then shows the various reporting parameters (such as dates, flags for formatting, account lists, product lists, etc.) that can be applied to each of the reports. All the parameters (checkboxes/list boxes/combo boxes/date controls, etc.) and their values displayed are metadata driven. Consequently, practically any report that has parameters that drive its generation can be added to the system without having to change the client application. A report creator/administrator can easily setup a new report and its associated parameter information using a tool which will then update a database which the client application taps into. Hence, the reporting interface may be flexible such that it can be used for any kind of report in any kind of business need.

The client application may also let a user create and save report jobs. A report job is a collection of one or more reports and all their respective parameter values that might be used on a repeated basis. A job allows a user of the client application to come back in another session and quickly run a previously setup job without having to remember all the prior parameter values. A job can be saved under a user-selected name, and can be scheduled to run at a later time and/or on a repeated, periodic schedule. The job schedules can depend on global regional time zones and/or depend on trigger events. A job can also be used to bundle reports together as a report package in a custom order. In addition, the RMS may deliver the completed reports via a variety of distribution means, including email, fax, ftp, web link, file system drop etc. Also, different file formats, such as PDF, Excel, TXT, CSV, Word, PS, etc. can be used for the output formats. A job's run history and details may also be viewable from the user interface display.

The RMS may be implemented as an architecture having a repertoire of flexible and scalable servers that provide services which collaborate together to make a typical reporting life cycle possible. A report workflow (which may define a lifetime of a report from start to end) may conceptually be broken down into one or more optional discrete tasks chained together to achieve a reporting activity. Some of the core reporting components used to execute the workflow steps are one or many data accessors (programs that let the RMS obtain data from databases/other data provider services/files), formatting services (responsible for all the formatting, colors, graphs shown on the reports), bundling/packaging services, distribution services (Fax, Email, FTP, SSL, Internet publishing), scheduling services, etc. The RMS may also provide a metadata service that provides the list of report names and their parameters to show on the client application, and a job manager service that can be instructed to save a job or retrieve and load the user's report parameters from saved jobs (stored in a database) based on the user's entitlements. The RMS may also include one or more fault tolerant, metadata-driven workflow controller services to coordinate a report's execution in order to generate a report in the system. The system also allows additional services like a language translation service of report data using a dictionary based lookup service to any foreign languages or between two different language contexts within the same language. The RMS can be adapted to handle multiple client requests simultaneously in a transport independent (e.g., HTTP/MQ/TCP) way. Also, the RMS can be scaled up and load balanced using a router.

DESCRIPTION OF THE FIGURES

Various embodiments of the present invention are described herein by way of example in conjunction with the following figures, wherein.

DETAILED DESCRIPTION

Figure 1:
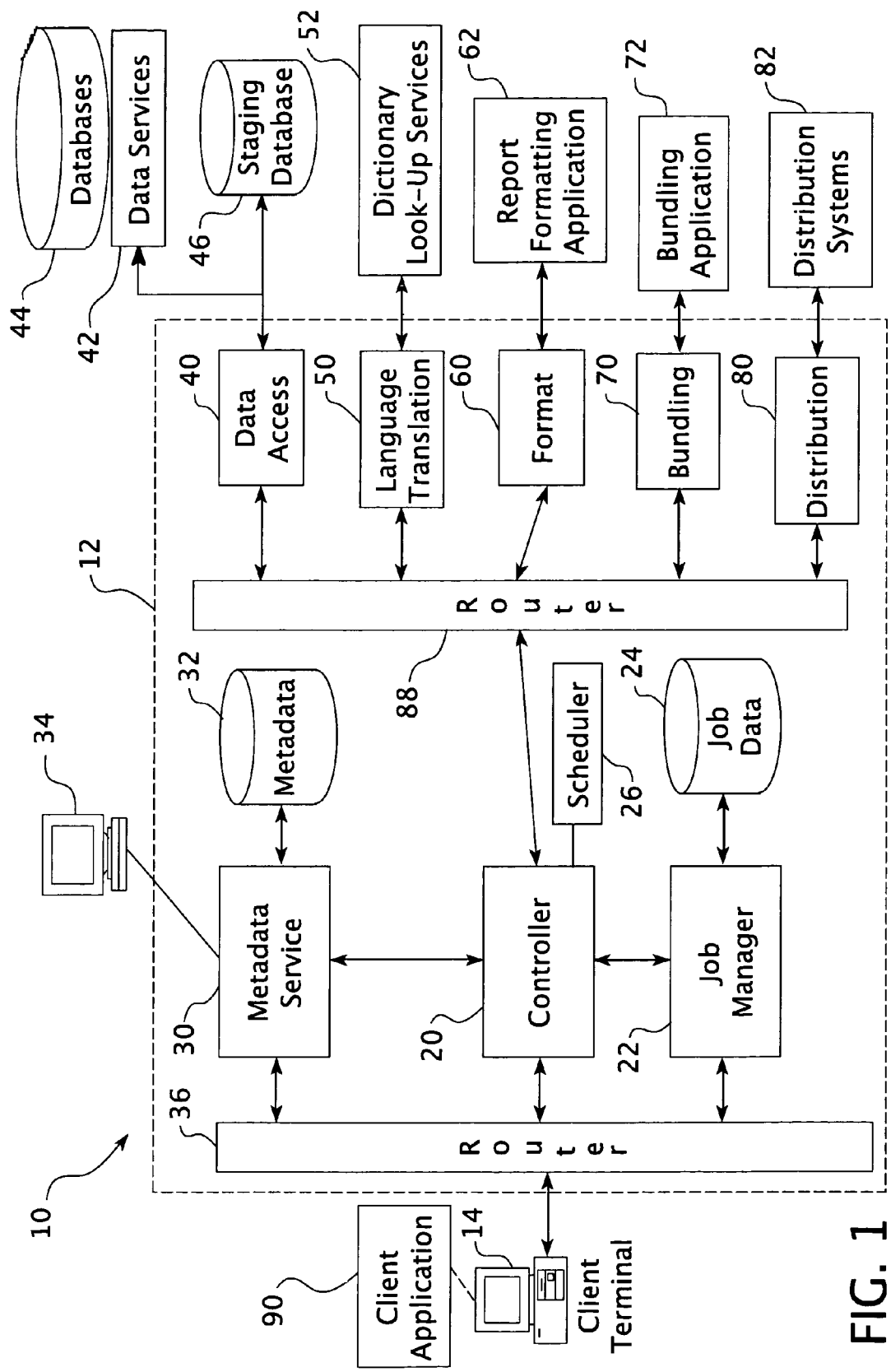
FIG. 1 is a diagram of a workflow-based and metadata-driven reporting system according to various embodiments of the present invention.

FIG. 1 is a diagram of a workflow-based and metadata-driven reporting system 10 according to various embodiments of the present invention. The system 10 includes a report manager system (RMS) 12 in communication with one or more client terminals 14. The RMS 12 may be implemented as an architecture of one or a number of distributed networked computing devices, such as PCs, servers, workstations, etc., programmed to run, format and distribute reports requested by users of the system 10. A user, as described in more detail below, may define a report job for execution by the RMS 12 using the client terminal 14. The client terminal 14 may be implemented, for example, as a computing device, such as a PC, laptop or workstation, in communication with the RMS 12 via a data network (not shown), such as, for example, a LAN, a WAN, etc. In FIG. 1, only one client terminal 14 is shown, although it should be recognized that the RMS 12 may be in communication with numerous client terminals located throughout an enterprise. Further, in certain embodiments, the RMS 12 can simultaneously communicate with the multiple client terminals in a transport independent way. For example, the communications between the RMS 12 and the client terminals may employ the HTTP, MQ and/or TCP communication protocols. The communication could be either synchronous (the client application waits to get responses back) or asynchronous (e.g., the client receives responses that are published by the RMS as and when they get published).

As shown in FIG. 1, the RMS 12 may include one or more fault tolerant, metadata-driven workflow controller services 20 (sometimes referred to herein as a "controller"). A workflow control service is a software application executed by a computer for controlling and coordinating execution of a report's various execution steps to generate a completed report. Only one controller 20 is shown in FIG. 1 for purposes of simplicity. Also, the RMS 12 may include a job manager service 22 and a job database 24. Report jobs defined and stored by the user at the client terminal 14, the process of which is described in more detail below, may result in job definition instructions being stored in the job database 24. At run time, which may be triggered by either a real-time run request from the user or a scheduler 26 for scheduled reports in a batched mode, the job manager 22 may retrieve the parameters for the report job and communicate them to the controller 20 for execution. Also, the job manager 22 can retrieve the parameters from the job database 24 for a previously saved/created job when a user, via the client terminal 14, chooses to edit or otherwise view the settings/parameters for the previously created job.

When a user initiates a report session at the client terminal 14, the client terminal 14 may make a request to either a metadata service 30 or the job manager 22, based on the mode of use of the user. The metadata service 30 is a software application executed on a computer that may provision a continuously running process. The metadata service 30 has associated with it a metadata database 32. The metadata database 32 may include one or multiple tables that together include reports, associated parameters for the reports, default values for the parameters, and the workflow steps (the steps that the must be invoked for execution of the report) for reports. When, for example, a user logs on in a client session, the metadata service 30 may query the metadata database 32 to determine the reports that the user is entitled to based on the user's entitlements, the parameters that the reports need, and the default values for the parameters, and communicates that data back to the client terminal 14. This data is used by the client application at the client terminal 14 when the user chooses, via the user interface at the client terminal 14, to run a report(s) or save a report job. If the user selects to edit or otherwise view the parameters for a previously-defined report job, the job manager 22 may retrieve the relevant parameters (e.g., dates etc.) from the job database 24 and communicate the data back to the client terminal 14.

The workflow controller service 20, the metadata service 30 and the job manager service 22 may be implemented as one or a number of computing devices (e.g., PCs, servers, mainframes, etc.) programmed to provide the services. According to one embodiment, one instance of the combination of the metadata service 30, the job manager service 22 and the controller 20 may be implemented on a common computer device(s). According to other embodiments, each service may be provided by a separate computer device(s).

The system 10 may also include one or more computers running an administrative front end application 34 (referred to sometimes as an "administrative application") for administering a new report setup by communicating with the metadata service 30. The metadata administrative application 34 may be used to, for example, provision the metadata database 32. For example, if a new type of report is needed or new parameters are needed for a report, the metadata database 32 may be provisioned to include data for the new reports or parameters. In that way, when a new report type or updated parameters are needed, the metadata database 32 can be provisioned to include this metadata for one or more users of the system 10. The metadata database 32 may also be provisioned with information about a report's workflow, i.e., the various steps needed to chain together to successfully execute a report processing job. Thus, the administrative application 34 can be used to create a new report or parameter, or update the metadata for existing reports and parameters of the system 10.

For redundancy purposes, the RMS 12 may include multiple controllers 20, multiple job managers 22, multiple metadata services 30, etc., although only one of each is shown in FIG. 1 for purposes of simplicity. For this reason, the RMS 12 may include a router 36, which may provide load balancing for the multiple instances of the RMS architecture. For example, if one of the controllers 20 goes down, the router 36 may route job request traffic from the client terminal(s) 14 to available controllers, job managers, metadata service engines, etc. Also, the router 36 may provide a single point of reference for the RMS 12. That is, for example, the client terminals 14 need only communicate with the RMS 12 using the physical IP address for the router port, rather than establishing separate communication sessions with the job manager 22, metadata service 30 or the controller 20. That way, as long as the messages from the client terminals 14 have a tag indicating the address of the destination of the message, such as to the job manager 22, metadata service 30 or the controller 20, the router 36 can appropriately route the incoming messages. One advantage of this arrangement is that the client terminal 14 does not need to be made aware of changes in the address for the job manager 22, metadata services 30 or the controller 20, for example.

The controller 20 may be in communication with a number of components/adapters of the RMS 12 that communicate with data sources external to the system and other applications for purposes of running, formatting, bundling and distributing the reports. For example, the RMS 12 may include a data access adapter 40 that communicates with external data services 42 and databases 44, for example, to obtain the data needed for the requested reports. The data access adapter 40 may also store the job-relevant data in files (such as flat or XML files) or in a staging database 46 for use in other future workflow steps of the report generation process. The data for a particular report job may be stored with an associated, unique job run code. In that way, other report services can locate and use the appropriate data for a particular report job by using the data associated with the job run code for the specific job in a future workflow step. In other words, a unique run code/identifier links together the various workflow steps together for a report run.

The RMS 12 may also include a language translator adapter 50. The language translator adapter 50 may interface with a dictionary look-up application 52 to translate the report into various languages, as requested by the user in creating the report.

The RMS 12 may also include a format adapter 60 for interfacing with one or more report formatting applications 62. The report formatting applications 62 may format the job relevant data, stored in, for example, files or the staging database 46, according to an output format specified by the user at the client terminal 14 and communicated to the report formatting applications 62 by the controller 20. For example, the report formatting applications 62 may use the following output formats: Crystal report files, spreadsheet (e.g., EXCEL) files, PDF files, text (TXT) files, word processing (e.g., Word) files, postscript (PS) files, etc. The RMS 12 allows for scalability in the number of adapters. The type of formatting applications can be augmented. For instance, another type of formatter might be responsible for handling data feed formatting using a different application.

The RMS 12 may also include a bundling adapter 70 in communication with a bundling application 72. The bundling application 72 may bundle multiple reports into one bundled report, and in a particular order, pursuant to the report creation parameters input by the user, as discussed in more detail below.

The RMS 12 may also include a distribution adapter 80 for interfacing with distribution systems 82 that distribute the final report. For example, the reports may be directed to various printers or fax machines for hard-copy print outs of the reports. Also, the reports may be distributed by an email system to various email recipients. Also, the final reports may be transferred as a file to a recipient over a data transfer network using, for example, FTP.

For purposes of simplicity, only one instance of each component/adapter is shown in FIG. 1, although it should be recognized that multiple instances of the components/adapters may be used. A second router 88 may be used for load balancing of multiple instances of the components/adapters. Also, according to various embodiments, the routing functions of the two routers 36, 88 may be handled by a single router.

The client terminal 14 may include a client application 90. The client application 90 may provide a graphical user display window, e.g., a GUI, for a user of the client terminal 14 to define, save and run report jobs. The application 90 may or may not be based on an internet browser. The client application 90 may be implemented as software code to be executed by a processor (not shown) of the client terminal 14 using any suitable computer instruction type such as, for example, Java, C, C++, Visual Basic, Pascal, Fortran, SQL, etc., using, for example, conventional or object-oriented techniques. The client code might reside on the user's desktop or might be accessible over the network. The software code may be stored as a series of instructions or commands on a computer readable medium. In other embodiments, the client application 90 may be stored on a remote server, and the client terminal 14 may execute the application through a browser application.

Figure 2:
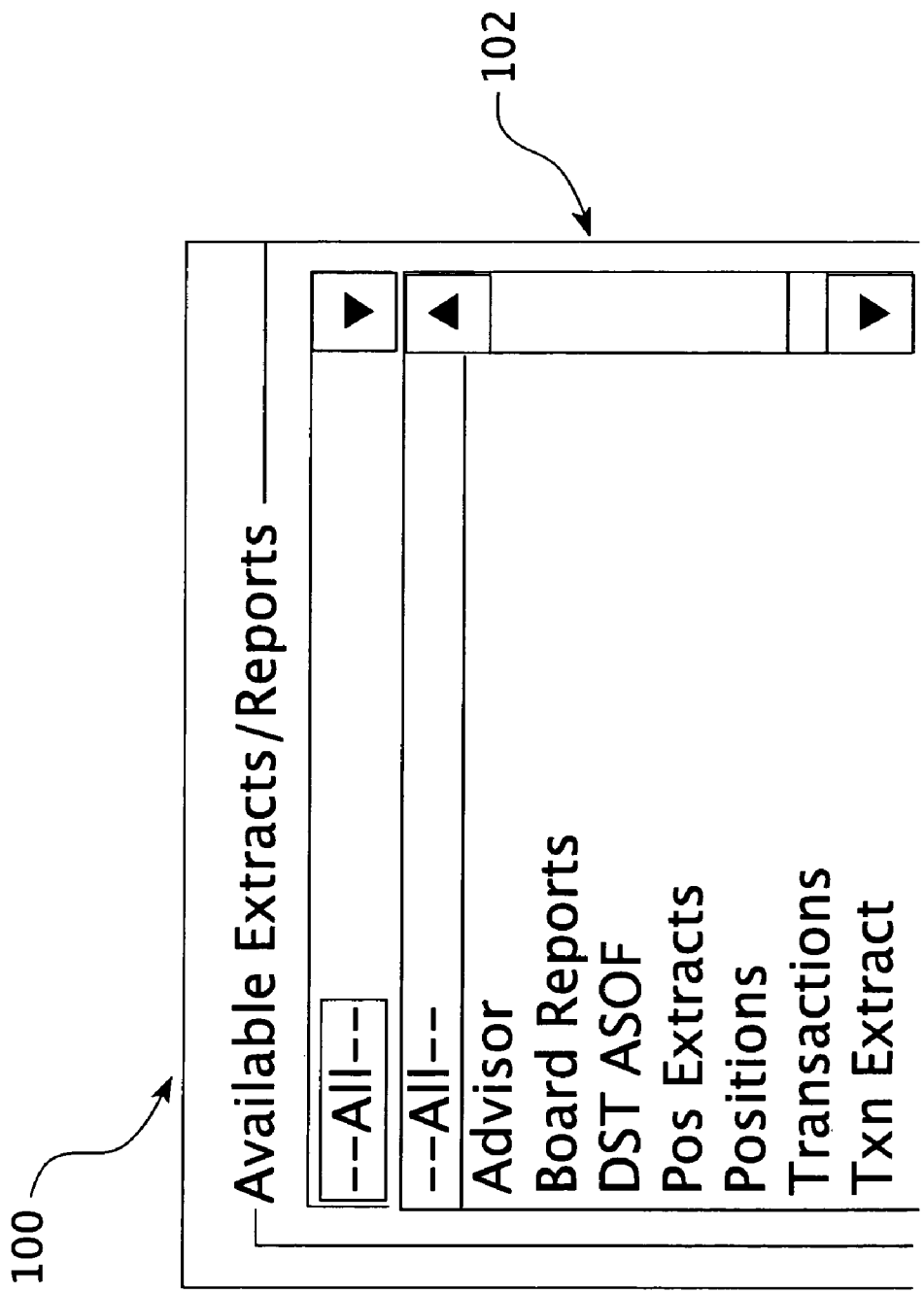
FIGS. 2-15 display portions of the user interfaces according to various embodiments of the present invention.

After initiating the client application 90, the user may first log in by entering a user ID and password. A start up menu may provide the user with a number of options, such as creating new report jobs, modifying the parameters of existing report jobs, scheduling report jobs, or running report jobs. FIG. 2 is a screen shot of a portion of a user-interface display window 100 according to various embodiments of the present invention that allows a user to create a new report job. In the "Available Extracts/Reports" drop-down window field 102, the user may select the category of report(s) for the new job, such as Advisor reports, Board reports, Pos Extracts reports, Positions reports, Transactions reports, etc, for example. Other categories of reports could be defined by the system administrator. By selecting "All," the user may select all of the report categories. This selection choice may be useful for administrative purposes.

The selections available to the user in the job-creation mode may be based on the entitlements of the user. For example, certain users may only be able to generate certain types of reports. Information about the entitlements of the user may be stored by the RMS 12. When the user logs in, the metadata service may read the entitlements of the user from a database (such as the metadata database 32 or a different database) to determine the available report categories for the particular user, and the drop-down window field 102 may only list those report categories.

Figure 3:
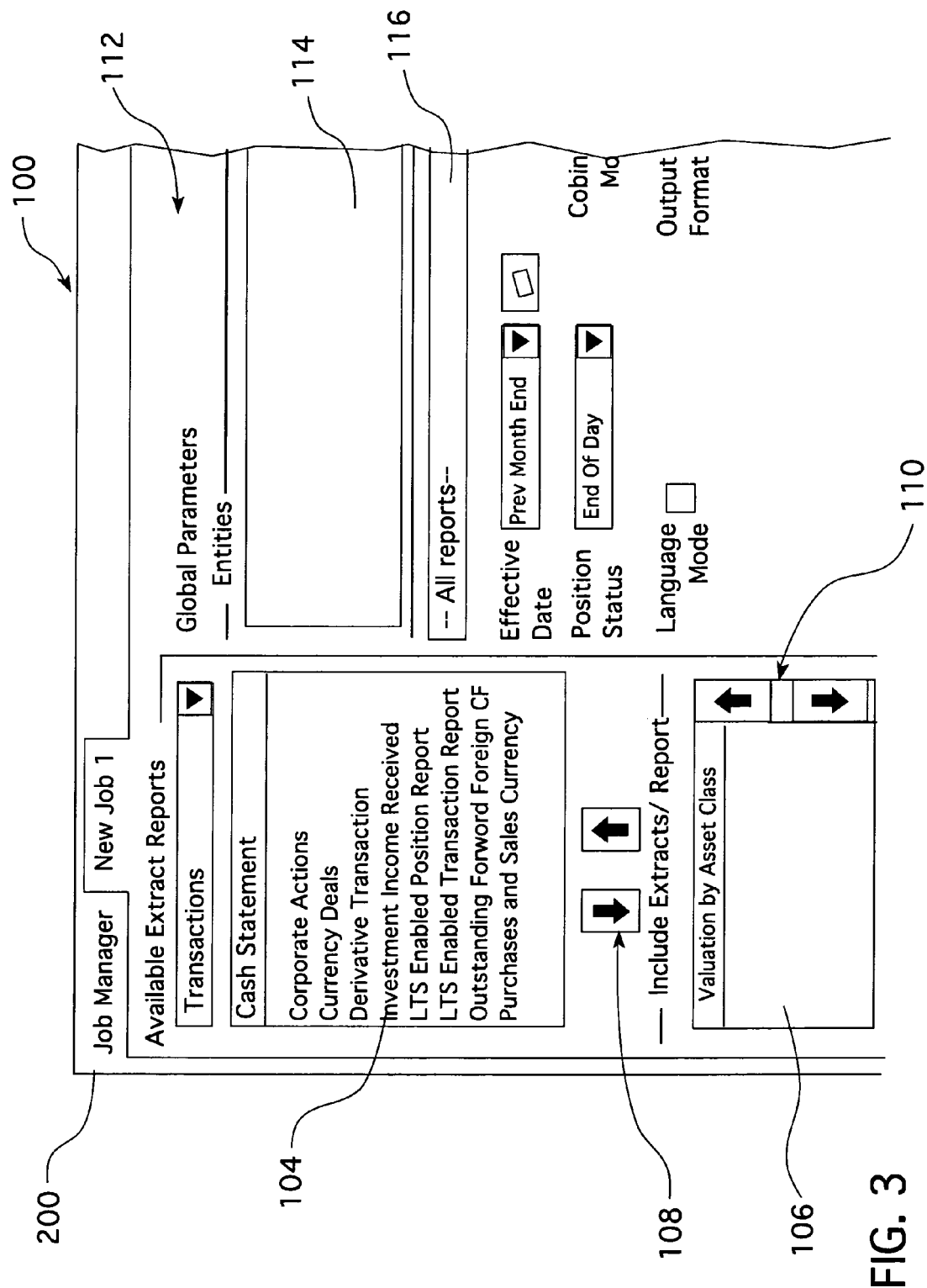

Upon selection of a report category by the user, as shown in FIG. 3, the display window 100 may display a field 104 listing reports for that category. In the example of FIG. 3, different reports for the "Transactions" category are displayed. The user display, however, is, of course, configurable, as mentioned above, by the metadata in the metadata database 32 as provisioned by the administrative application 34. The user may select the desired report, which is then displayed in field 106. Selection of the desired report may be done, for example, through any known and/or conventional user interface technique, such as hitting the "Enter" key when the desired report is highlighted, right-clicking on a mouse when the desired option is highlighted, using the selection arrows 108, etc. Also, a user may select multiple reports. In that connection, a user may also select reports from different categories, and the field 106 would be populated with these different reports. That is, a user could select one (or more) reports from field 104, and then change the report category in field 102 to additionally select a different report (or reports) from a different category. The user may also order the selected reports with the arrows 110 or by other conventional user interface means. Again, the reports displayed to the user in field 104 may be dependent upon the entitlements of the user.

Figure 5:
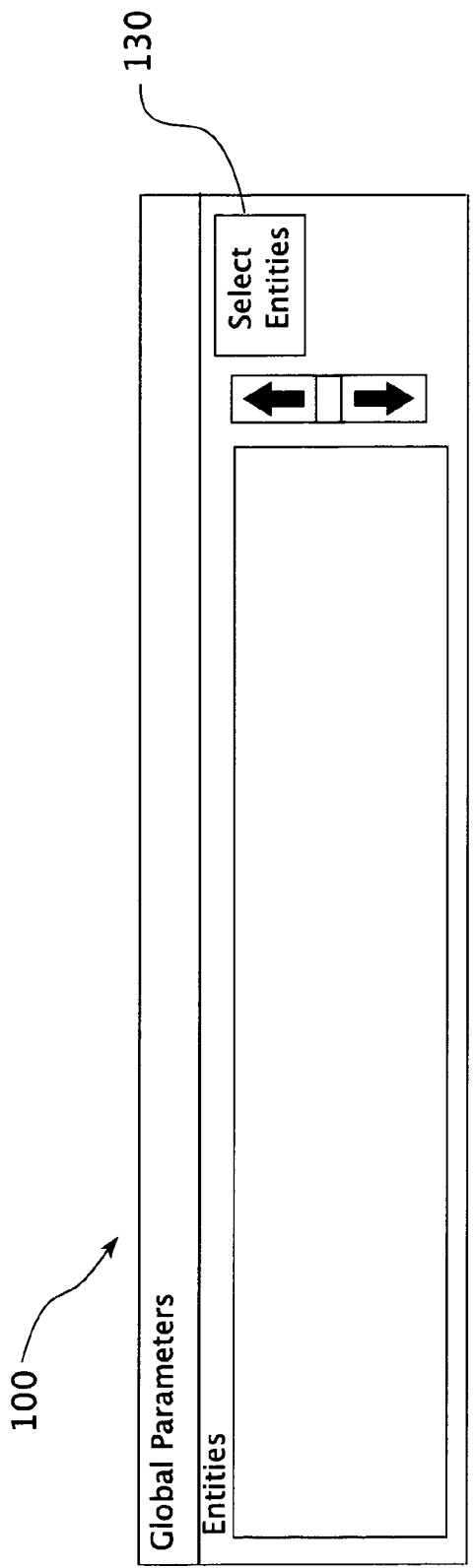
Figure 6:
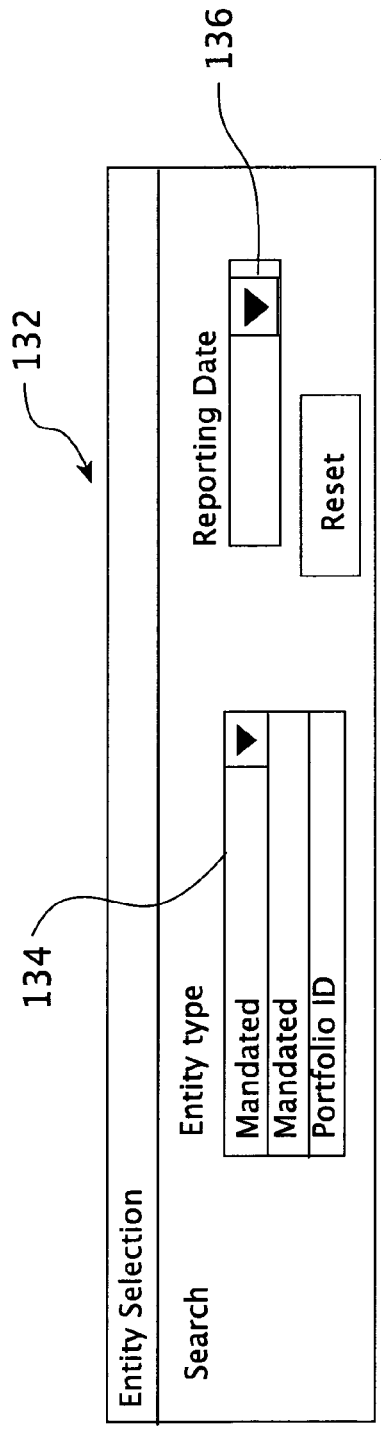
Figure 7:
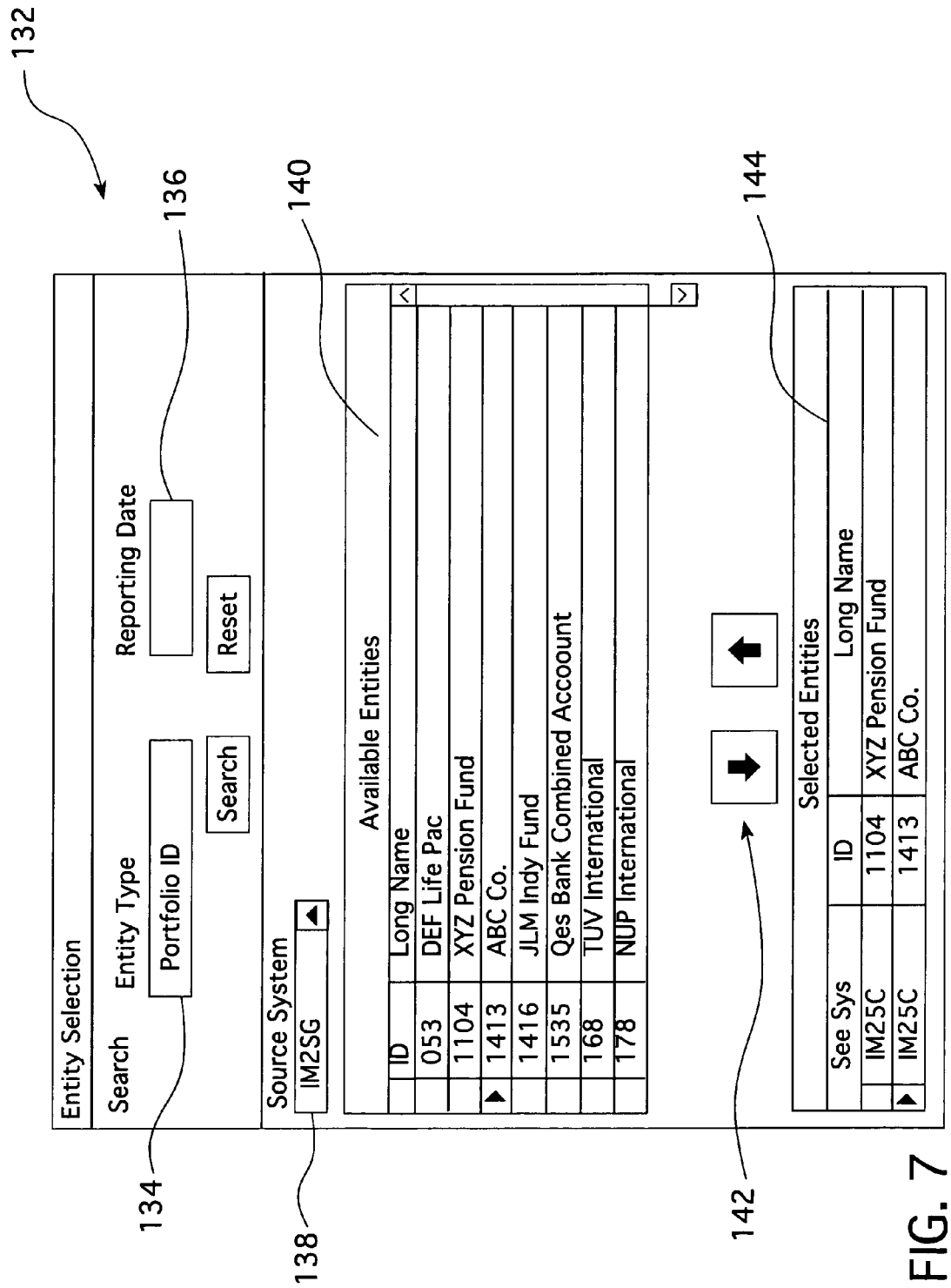

The parameters field 112 allows the user to select parameters for the various chosen reports. The parameters may be different kinds of generic controls such as drop down boxes, checkboxes, and date boxes that can be given a name and setup in the metadata database 32. Any new report can have one or more of these generic controls associated with it. Using the metadata administration application 34, an administrator can setup a name and type information. Parameters can also be setup to be associated with other parameters. For example, parameters may have values that change when another parameter value changes. Parameters may contain lists of values (as in the case of drop downs). The source for those values can be specified at report setup time, and those sources can be from database tables or files, etc. For example, in field 114, the user may select certain entities for the reports. For financial services applications, the entities may be, for example, portfolio IDs, account identifiers, product identities, broker names, etc. The values contained in this entity box could be coming from a table of portfolioID values. The entity selection process is explained in connection with FIGS. 5-7. Referring to FIG. 5, the user may choose an entity or account by clicking on the "Select Entities" button 130. This may cause an "Entity Selection" dialog box 132 to open, as shown in FIGS. 6 and 7, which allows the user to search for the appropriate entities. In the "Entity Selection" dialog box 132 the user may specify the entity type from a drop-down window 134, for example. The entity type may be a further classification of the entities, e.g., sub-classification of entities. Also, the user may select the reporting date at a drop-down window 136.

The user may also select the source system in field 138, for example, shown in FIG. 7. This may be a filter condition, such as entities organized by office location within an enterprise. For the chosen entity type and source system, the "Entity Selection" dialog box 132 may then display the available entities in field 140. The user may then specify the appropriate entities by double-clicking on them or using the arrows 142. The selected entities may then appear in the "Selected Entities" field 144. The user may then click an "Apply" button (not shown) to apply the selected entities. This may close the "Entity Selection" dialog box 132.

Figure 4:
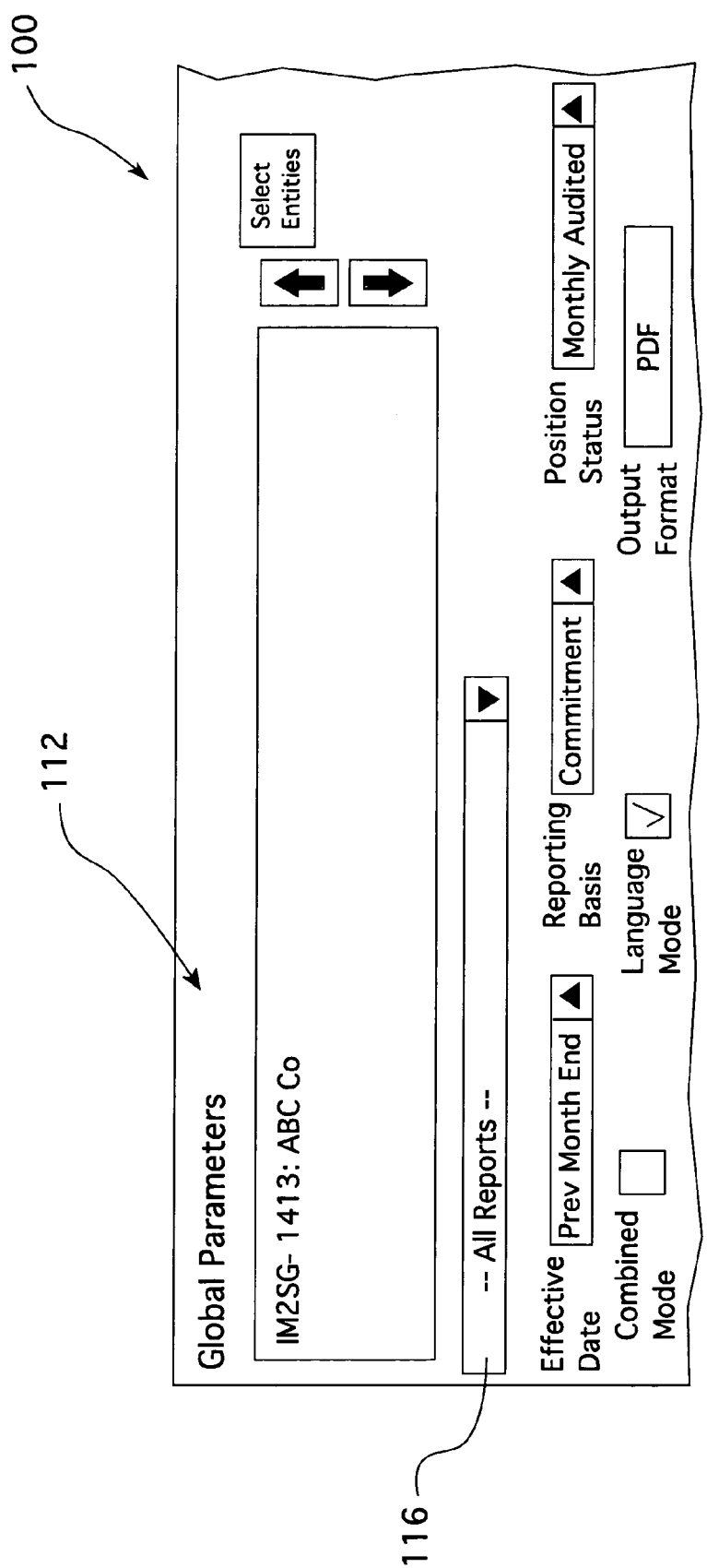

In the example of FIG. 4, the selected entity is shown in the "Entities" field 112. To set the report parameters for the selected reports pertaining to this entity(ies), in the drop-down window field 116 the user may select the report (or reports) for which it desires to specify the parameters. For the selected report, the metadata service 30 of the RMS 12 (see FIG. 1) may read from the metadata database 32 the relevant parameters for that report and show them in the display window 100, as shown in the example of FIGS. 3 and 4. When a new parameter is required for a report, the metadata database 32 can be provisioned to include the new parameter as metadata for the report. When that report is loaded after adding the new parameter, the parameters field 112 will include a field for the new parameter. Where all reports are selected, as in the example of FIGS. 3 and 4, the parameters shown may be parameters that pertain to each report selected by the user.

As shown in the example of FIGS. 3 and 4, the parameters may be, for example, effective date (e.g., the date the report is to be run), position status (e.g., monthly audited, real time, etc.), reporting basis (e.g., commitment, settlement date), combined mode (e.g., check if you wish to combine the selected reports), language mode (choose a selected language), output format (e.g., PDF, spreadsheet, word processing document), etc. Each parameter may have an associated drop-down window or check field by which the user may select the desired value for the parameter. The system 10 could be tailored to satisfy any relevant parameter and could easily be modified, by administration of the metadata service 30 and the metadata database 32, to include new parameters, as described above. According to various embodiments, the parameter values chosen for "All Reports" may be applied to each selected report unless explicitly overridden by the user at the individual report level. For example, under "All Reports," the user may select "Monthly Audited" for the position status, but when selecting the parameters for an individual report specified in the field 116 (e.g., Report A), the user may select "Real Time" for the position status for that particular report. In that case, all reports except Report A will have "Monthly Audited" for the position status and Report A will have "Real Time" for the position status.

Figure 9:
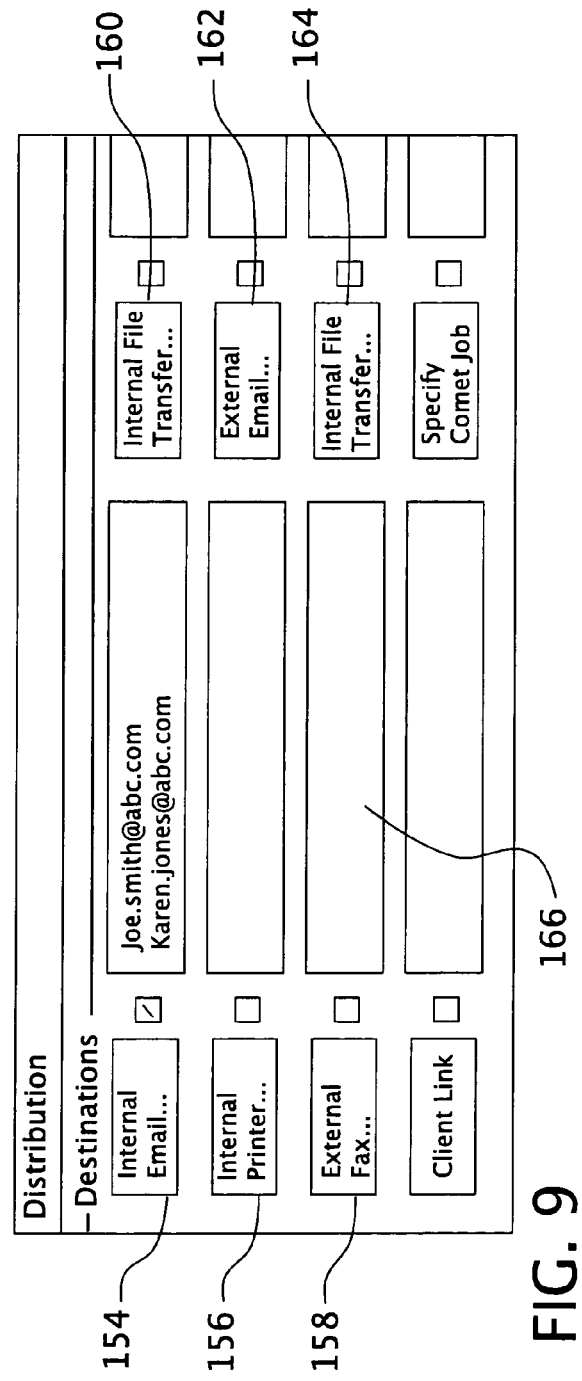
Figure 10:
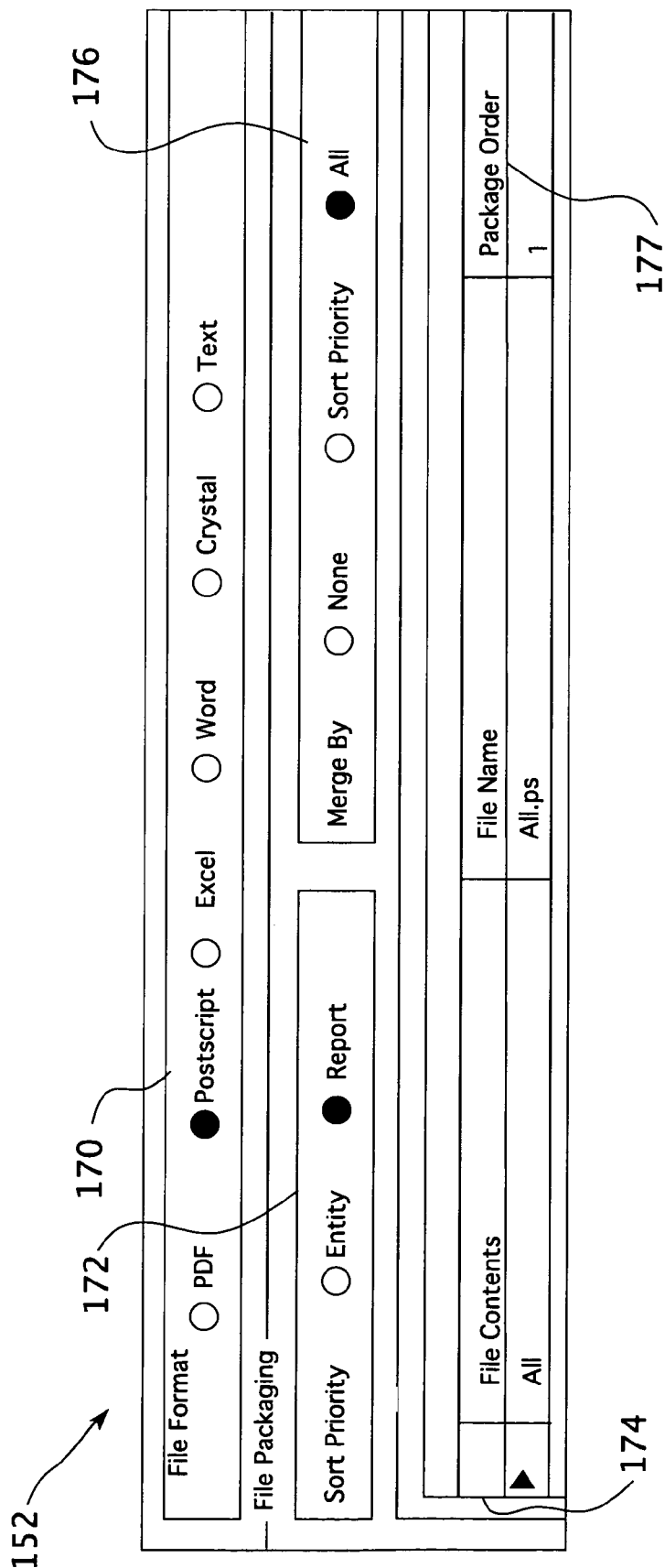

To complete and run a job, the destination options for the reports should also be specified. This may be accomplished, for example, by clicking the "Delivery and Notification" button 150 of the display window 100, shown in the example of FIG. 8. This may cause a "Distribution" dialog box 152 to open, as shown in FIGS. 9 and 10. In the "Distribution" dialog box 152, the user may specify the destination of the report(s) by clicking any of the destination buttons, such as an "Internet Email" destination button 154, an "Internal Printer" button 156, an "External Fax" button 158, an "Internal File Transfer" button 160, an "External Email" button 162, an "External File Transfer" button 164, etc. The user may then specify the recipient's address for the chosen distribution means by typing the address in the corresponding address fields 166. The number of destinations that a user gets to pick from may also be driven by entitlements. Some users might see an option to send reports outside the firm and some might not.

The "Distribution" dialog box 152 may also allow the user to specify the file format of the report in field 170. The file format may be, as shown in the example of FIG. 10, PDF, Postscript, Word, Crystal, or Text. Other formats may also be permitted and/or used, including XML, HTML, etc.

When multiple reports are selected, the user may specify how the reports are to be packaged in the "File Packaging" field 172. For example, the user may be permitted to sort the reports in field 172 such that the selected reports appear in a specified order. The sorting may be done in the "Package Order" field 177 by specifying the package number. Also, where, for example, either Postscript or Text file formats were selected, the user may specify how the reports are to be merged in the "Merge By" field 176. According to various embodiments, if "None" is selected, the reports will arrive as separate files. If "Sort Priority" is selected, the reports may be merged according to the selected sort priority in field 172. If "All" is selected, the reports are merged into one comprehensive file.

Figure 8:
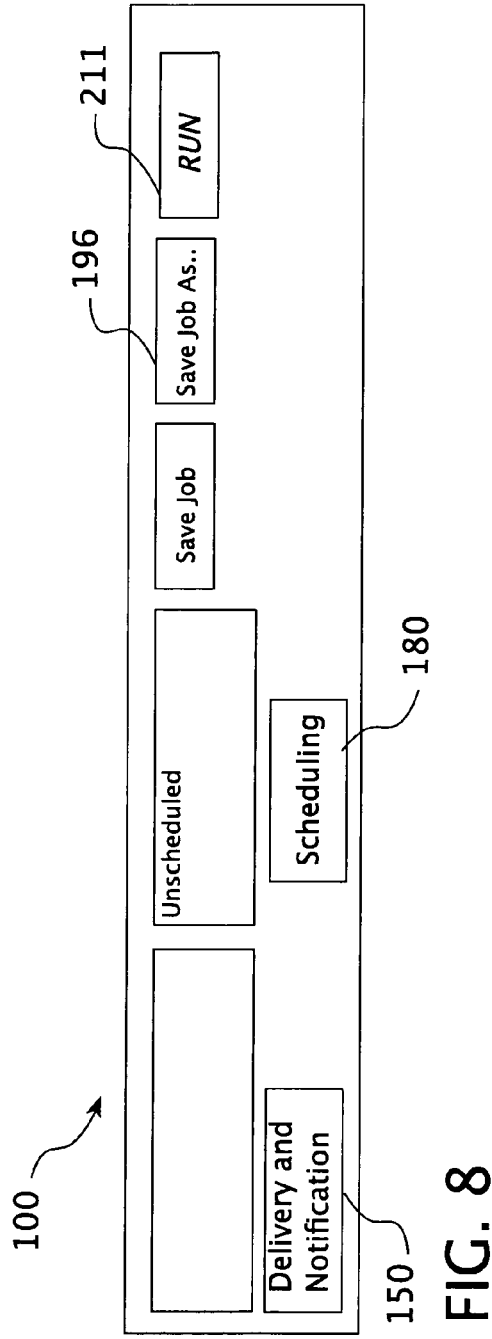
Figure 11:
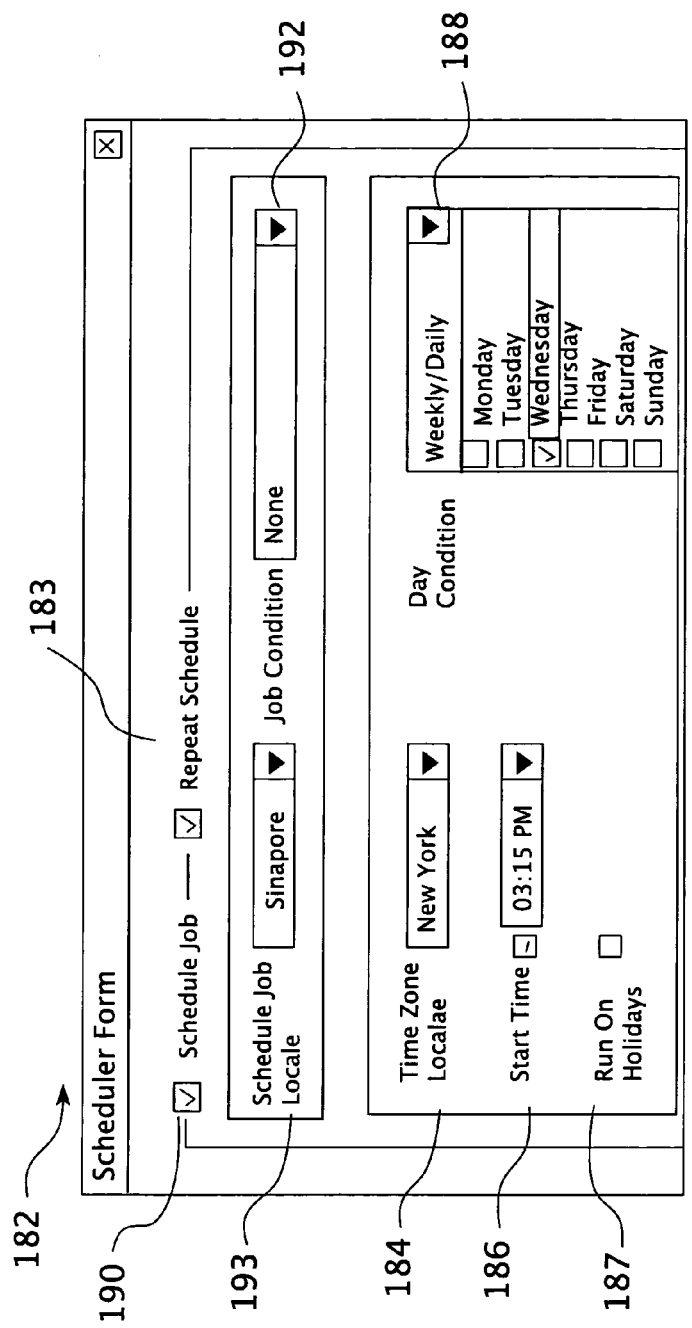
Figure 12:
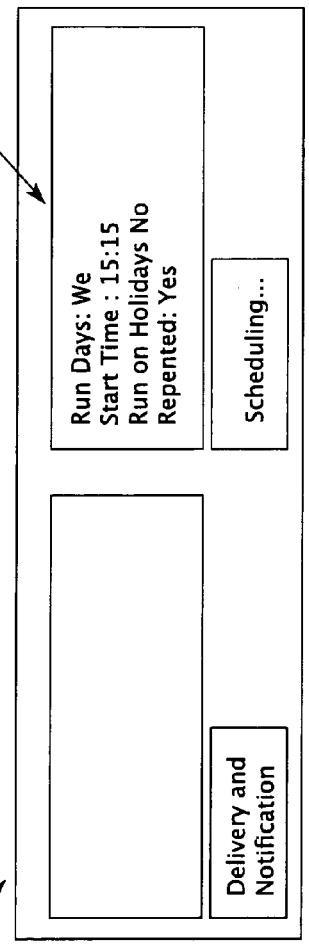

The reports may be scheduled by clicking the "Scheduling" button 180 of the display window 100, shown in FIG. 8. This may cause a "Scheduler Form" dialog box 182 to open, as shown in FIG. 11, which allows the user to schedule the run time of the report job. In the "Repeat Schedule" checkbox field 183, the user may indicate that the report job is to be run on a repeated schedule by checking (selecting) the repeated schedule option. If it is just a one-time report job, the checkbox field 183 would be unchecked (i.e., not selected). In field 184, the user may select the geographical time zone and, in field 186, the user may select the start time for running the report job. Also, the user may even specify whether the report job is to be run on holidays, for example, in checkbox field 187. In drop-down window 188, the user may select the periodicity of the report, such as daily, weekly, monthly, quarterly, etc. To unschedule a report job, the user could uncheck (or deselect) the "Schedule Job" checkbox 190. In addition, in the "Job Condition" drop-down window 192, the user may specify a trigger condition from a list of possible trigger conditions that cause the report job to be run. The trigger conditions may be, for example, completion of a prior report which is used in creating the current report. The "Job Stream Locale" field 193 is a trigger condition field that permits the user to specify the locale of a trigger condition. The user may then click the "Apply" button (not shown) for the scheduler Form dialog box 182 to input the schedule information. The schedule information may then appear in the display window 100, as shown in the example of FIG. 12.

Figures 13, 14:
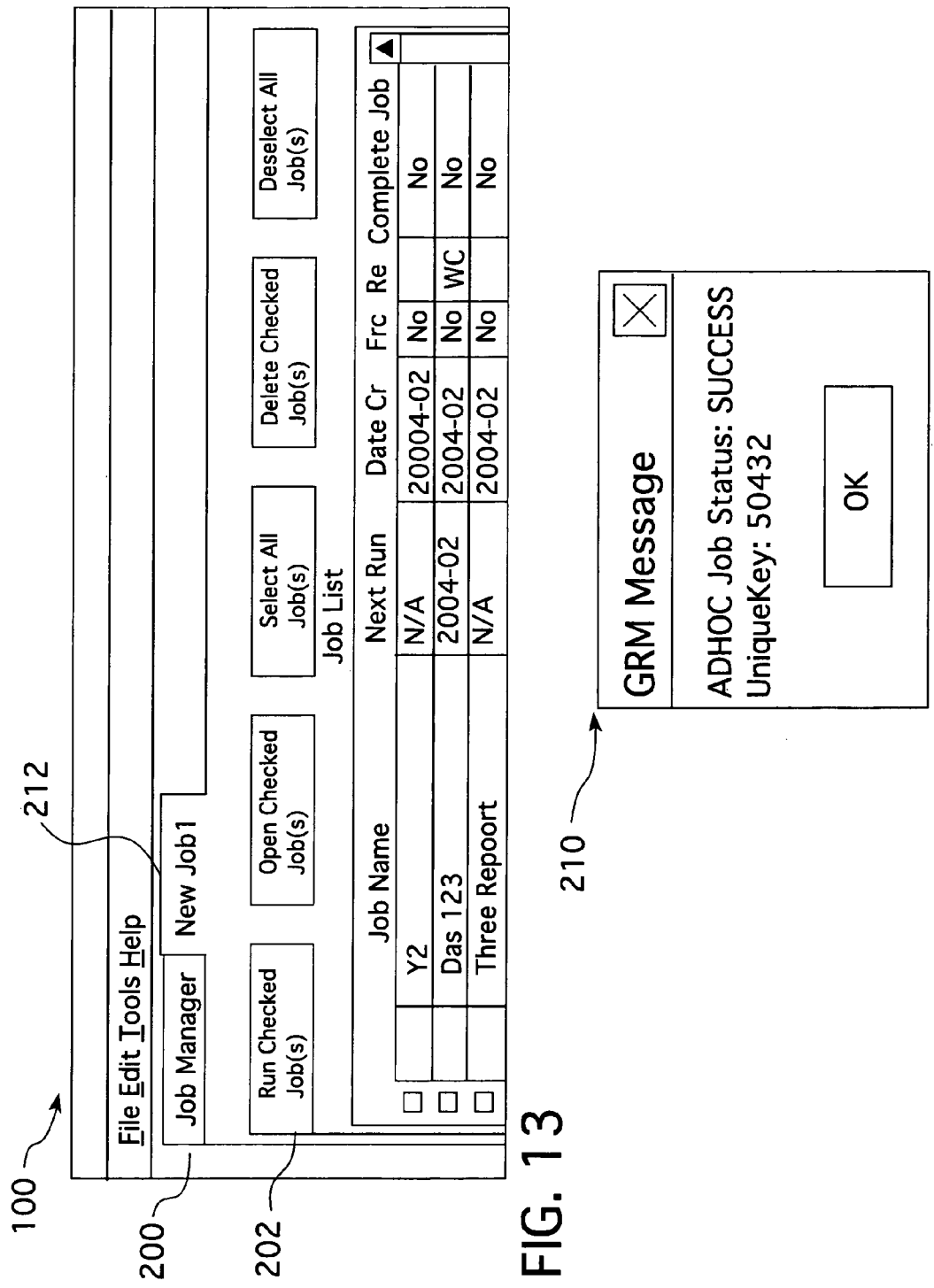

The user may save a report job, for example, by clicking on the "Save Job As . . . " button 196 of the display window 100, shown in FIG. 8. This may cause a "Save Job" dialog box (not shown) to appear, which allows the user to name and save the report job. The saved job may then appear under the "Job Manager" tab 200 of the display window 100, as shown in FIG. 13 (also see FIG. 3). All of the saved jobs of the user may appear under the "Job Manager" tab 200. Information about each of the saved jobs may also be displayed for the user in tabular form, as shown in the example of FIG. 13. The table may include information on, for example, the next schedule run time for the job, the date the job was created, the frequency of the job, etc.

The user may check some or all of the jobs for running (i.e., generation of the report) by checking the checkbox next to the job and then clicking the "Run Checked Job(s)" button 202. When this is done, a message box (not shown) may appear to inform the user that the report has been submitted. When a job is completed, a message box 210 will be displayed for the user, such as shown in FIG. 14, indicating the status of the job. For example, the message box 210 may inform the user that the job was successfully run, as in the example of FIG. 14, or it may inform the user that an error occurred in executing the job request. In such circumstances, the message may also include an error code. Another way to run a report job is to click the "Run" button 211 in the display window 100 (see FIG. 8).

Note that clicking the "New Job 1" tab 212 in the display window 100 of FIG. 13 will cause the fields associated with creating a new report job, described previously in connection with FIGS. 2-12, to appear for the user.

To check the status of a repeated report job, such as the run schedule of the report job over a period of time (e.g., thirty days), the user may click the "+" sign next to the report job. As shown in the example of FIG. 15, this may cause the previous run times and status of those run operations over the specified period of time to appear for the user.

Figure 15:
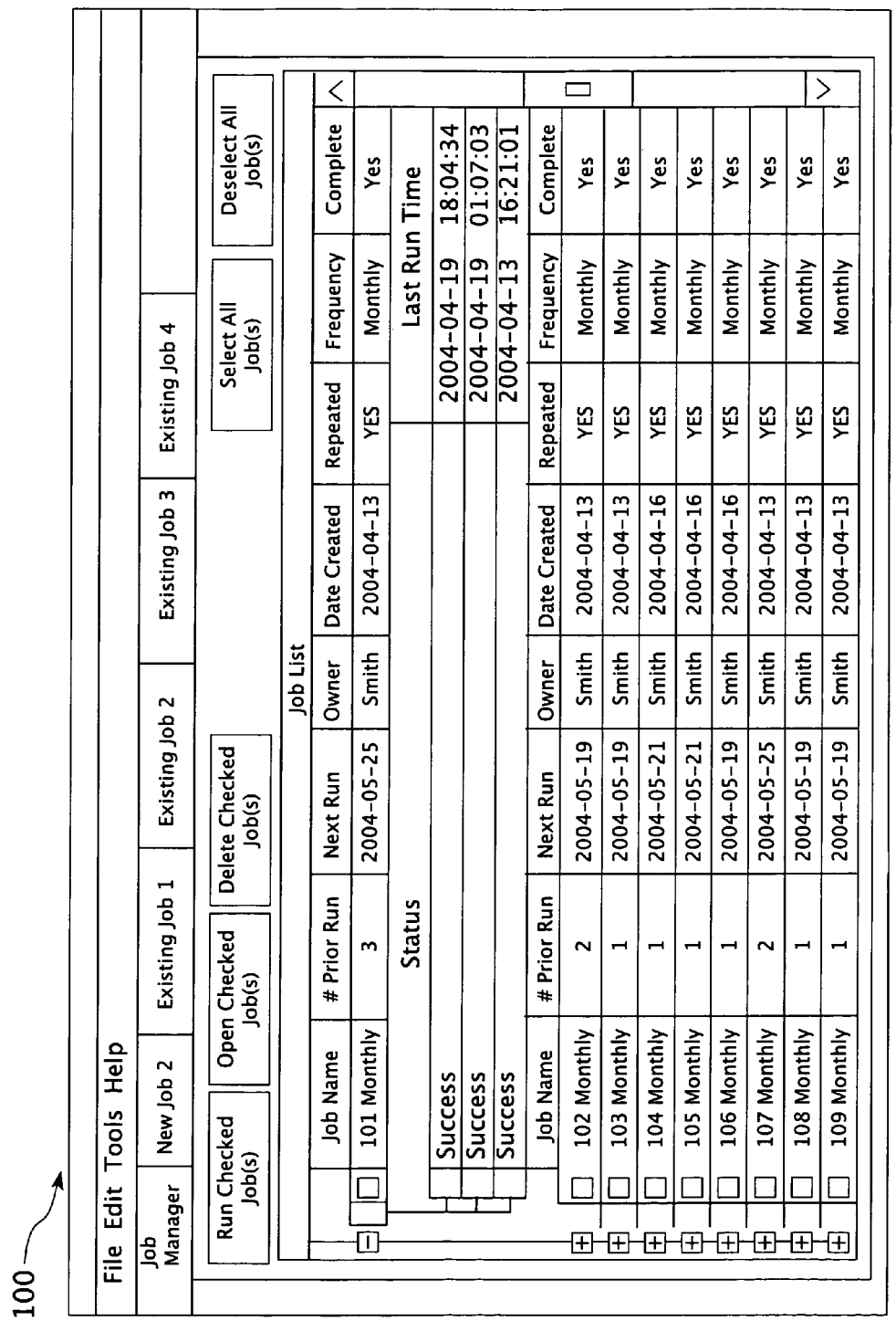

Also, as shown in the example of FIG. 15, the display window 100 may include tabs 220 for previously saved jobs of the user. Clicking on one of these tabs may cause the display window 100 to display the fields associated with creating the job, described previously in connection with FIG. 2-12. The values of the various parameter fields for the job may be populated with the values entered by the user in creating or editing the report job.

Figure 16:
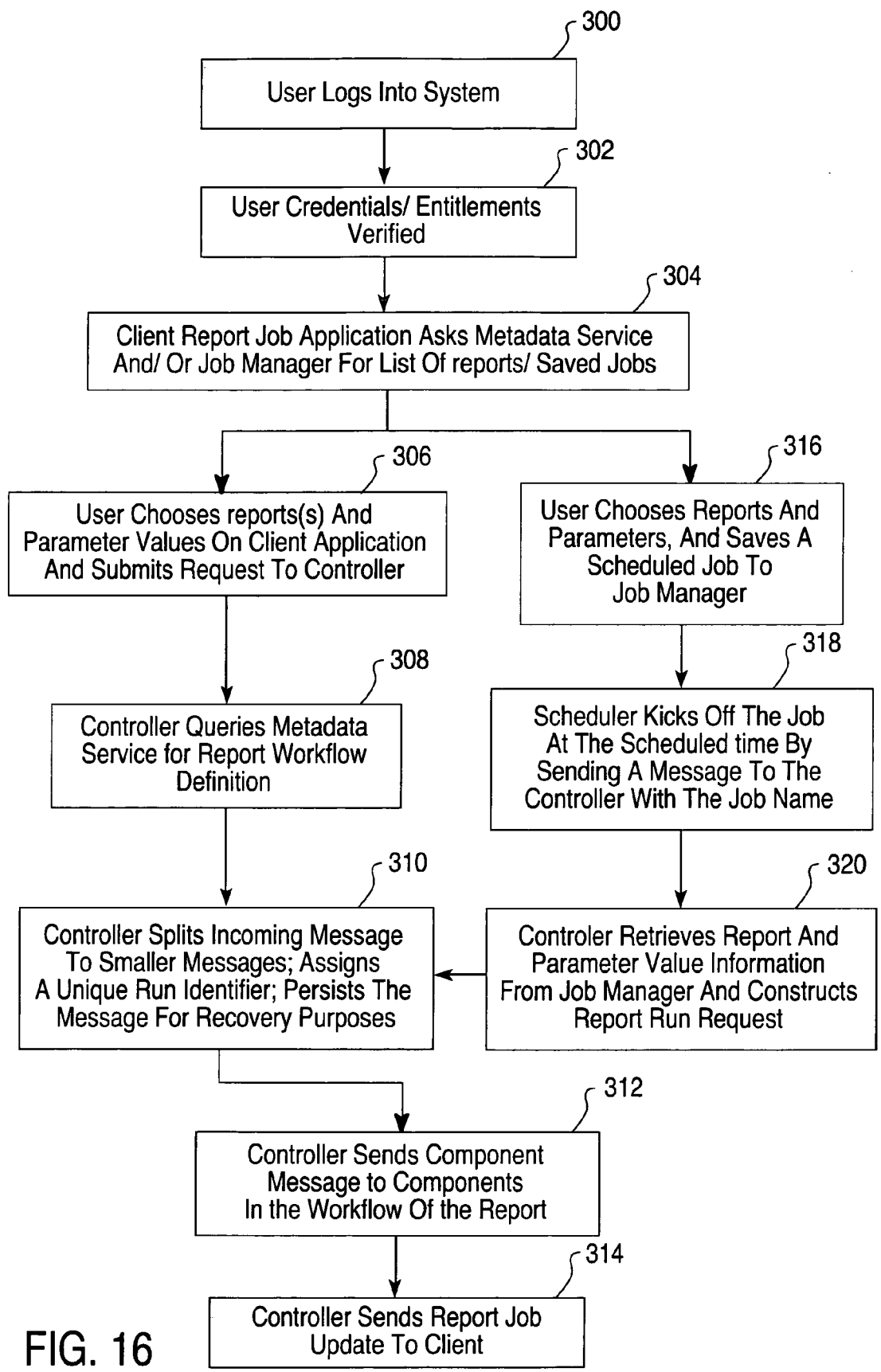
FIG. 16 is a flowchart illustrating operational details of the system according to various embodiments of the present invention.

FIG. 16 is a flowchart of the operation of the system 10 according to various embodiments. At step 300, the user may log into the system from a client terminal 14. At step 302, the user's credentials and entitlements are verified by the system at the back-end (e.g. RMS 12). At step 304, the client application asks the metadata service and/or the job manager 22 for a list of reports available to the user and/or the user's prior saved report jobs. For example, as discussed above, if the user selects the job creation/definition mode (such as by selecting the "New Job 1" tab 212 in FIG. 13), the metadata service may retrieve from the metadata database 32 the metadata for the reports (e.g., the parameters, the parameter values, etc.) to be displayed for the user based on the user's entitlements. If the user selects to view or edit a previously created report job (such as by selecting the "Job Manager" tab 200 in FIG. 13), the job manager 22 may retrieve the data for the user's previously created/saved jobs from the job database 24.

If the user wants to define and run a report job during the session (as opposed to edit a saved report job or define a report job for later, scheduled use), the process advances to block 306, where the user chooses the report(s) and parameter values for the job using the client application 90, the process for which is described above, and submits the job request to the controller 20. The message request may be, for example, a SOAP (Simple Object Access Protocol) XML message. The message might have all the report names and their parameter value information. Upon receipt of the request, at block 308, the controller 20 may make a call to the metadata service 32 to ask for the workflow definition of the report, i.e., the components that this report has to invoke in order to finish the report's execution. At block 310, the controller 20 may then split the incoming message into a number of smaller messages for sending to the components/adapters, e.g., components 40, 50, 60, 70, 80. These smaller sub-messages may also be SOAP XML messages. At block 310, the controller 20 may also assign a unique run identifier for the report and persist the message for recovery purposes.

At block 312, the controller 20 may send the various message components to the appropriate components/adapters for performance of the functions required for execution of the report job. Each component in turn might send back responses to the controller 20 with some indication of a success/failure and any other information that it generated which is useful for a subsequent workflow step. The controller 20 takes such information invokes the next workflow step until all of the steps have been completed. The workflow steps/components can be chained in any fashion, and it is not necessary for every available report in its workflow definition to invoke every component of the system 10. At block 314, the controller sends a report job update to the client (e.g., the job was successful or an error was created (with a corresponding error code)).

If, returning to step 304, the user desired to save a report job for later execution, the process advances to step 316, wherein the user chooses the desired reports and the associated parameters, including the run schedule. Upon submission by the user, the scheduled job is saved to the job manager 22. At step 318, at the appropriate time, the scheduler 26 initiates execution of the scheduled job by sending a message to the controller 22. The message to the controller 20 may identify the job by the job name. At step 320, the controller 20 retrieves the report and parameter value information from the job manager 22 and constructs a report run request based on the retrieved information. The process then advances to step 310, described above.

While several embodiments of the invention have been described, it should be apparent, however, that various modifications, alterations and adaptations to those embodiments may occur to persons skilled in the art with the attainment of some or all of the advantages of the present invention. For example, various steps of the processes described herein may be performed in different orders. Also, while the description above generally concerned report in the financial services industry, it should be recognized that the system could be used for other types of reports in other industries. It is therefore intended to cover all such modifications, alterations and adaptations without departing from the scope and spirit of the present invention as defined by the appended claims.

What is claimed is:

1. A workflow and metadata driven reporting system, comprising:
   at least one client computer device for executing a client application that allows a user to select one or more reports for execution via a user interface; and
   a computer-based report manager system in communication with the client application via an electronic network, wherein the computer-based report manager system comprises:
   a router connected to the electronic network;
   wherein the router comprises a hardware processor;
   one or more metadata services;
   one or more metadata databases;
   one or more workflow controller services in communication with the one or more metadata services; and
   one or more job managers in communication with the one or more workflow controller services;
   wherein the router provides a point of reference for the client computer device to communicate with the computer-based report manager system by using a physical Internet Protocol (IP) address for a port of the router;
   wherein the router further provides load balancing services for routing a report execution request by the user to the metadata services available, the metadata databases available, the workflow controller services available and the job managers available;
   wherein the one or more metadata services is for retrieving (i) a list of one or more reports that the user is entitled to define based on entitlements of the user as the user selects, via the user interface, to define a new report job,
   (ii) two or more parameters for the new report job selected by the user from the one or more reports that the user is entitled to define, and (iii) parameter values using entries in the one or more metadata databases for display to the user via the user interface prior to receiving the report execution request from the client application, wherein, as the one or more workflow controller services receives the report execution request from the client application on the client computer device during a client session for the new report job, the one or more workflow controller services is for retrieving a workflow for the new report job from the one or more metadata services, wherein the workflow indicates one or more steps to be invoked for execution of the new report job, and for sending a message to one or more service components for executing one or more tasks specified in the workflow for the new report job, wherein the one or more job managers is for retrieving a list of one or more saved report jobs of the user from a saved job database as the user selects, via the user interface, to access the one or more saved report jobs, wherein the two or more parameters for the new report job are provided on the user interface where the two or more parameters comprises: an effective date that is a date the one or more reports is to be run, a report bundle parameter to combine selected reports into one bundled report in a particular order, and a language mode parameter for translation of the report into one or more foreign languages as requested by the user;

and wherein, as the one or more workflow controller services receives an execution request for the saved report job from a report job scheduler, the one or more workflow controller services is for retrieving an another workflow for the saved report job and the parameter values for the saved report job from the one or more job managers, and for sending a message to the one or more service components for executing one or more tasks specified in the another workflow for the saved report job, wherein the message sent by the one or more workflow controller services to the one or more service components include Simple Object Access Protocol (SOAP) Extensible Markup Language message; and wherein the computer-based report manager system comprises a plurality of networked computer devices.

2. The system of claim 1, wherein the one or more workflow controller services receives the report execution request from the client application in the client session.

3. The system of claim 1, wherein the one or more job manager stores the new report job defined by the user during the client session, and wherein the one or more workflow controller service receives the report execution request from the report job scheduler as the new report job is scheduled to be run.

4. The system of claim 1, wherein the one or more service components send status messages back to the one or more workflow controller services.

5. The system of claim 3, wherein the one or more job managers retrieves data about the new report job to be displayed for the user on the user interface during the client session.

6. The system of claim 1, wherein the computer-based report manager system is in communication, according to a transport independent protocol, with a plurality of client applications, each of the plurality of clients application on a separate client terminal.

7. The system of claim 3, wherein the user interface allows the user to schedule the execution of the new report job.

8. The system of claim 1, wherein the user interface allows the user to specify an address for delivery of a finalized report.

9. The system of claim 1, wherein the user interface allows the user to bundle multiple reports in a user-specified order.

10. The system of claim 1, wherein the user interface allows the user to specify a file format for the one or more selected reports.

11. The system of claim 1, wherein the one or more service components include a report bundling component and a report distribution component.

12. The system of claim 11, wherein the one or more service components further include at least one of the following: a data access component; a language translation component; or a report formatting component.

13. A computer-implemented method, comprising:

wherein a router connected to an electronic network;

wherein a computer-based report manager system comprises: one or more metadata services, one or more metadata databases; one or more workflow controller services; and one or more job managers;

retrieving, by the one or more metadata services, a list of one or more reports for a user based on entitlements of the user when the user selects, via a user interface, to define a new report job;

retrieving by the one or more metadata service, two or more parameters and a list of parameter values for a new report job using entries in the one or more metadata databases prior to receiving a report execution request from the user;

providing, by a hardware processor in the router, a point of reference for a user terminal to communicate with the computer-based report manager system by using a physical Internet Protocol (IP) address for a port of the router;

providing, by the router, load balancing services for routing the report execution request by the user to the metadata services available, the meta databases available, and the work controller services available and the job managers available;

wherein the two or more parameters for the new report job are provided on the user interface where the two or more parameters comprises: an effective date that is a date the one or more reports is to be run, a report bundle parameter to combine selected reports into one bundled report in a particular order, and a language mode parameter for translation of the report into one or more foreign languages as requested by the user;

supplying, by the one or more metadata services the list of reports, the two or more parameters, and the list of parameter values to the user at the user terminal prior to receiving the report execution request from the user to allow the user to select one or more the reports for execution via the user interface at the user terminal;

receiving, by one or more workflow controller services in communication with the one or more metadata service, the report execution request for the new report job selected by the user from the one or more reports;

obtaining, by the one or more workflow controller services a workflow for the new report job, wherein the workflow indicates one or more steps to be invoked for execution of the new report job;

sending, by the one or more workflow controller services, a message to one or more service components for executing one or more tasks specified in the workflow for the new report job;

retrieving, by one or more job managers, a list of one or more saved reports of the user from a saved job database when the user selects, via the user interface to access a saved report job;

receiving, by the one or more workflow controller services, an execution request for the saved report job from a report job scheduler;

retrieving, by the one or more workflow controller services, an another workflow for the saved report job and the parameter values for the saved report job from the one or more job managers;

sending a message, by the one or more workflow controller services to one or more service components;

wherein the message sent by the one or more workflow controller services to the one or more service components include Simple Object Access Protocol (SOAP) Extensible Markup Language message; and executing, with the one or more service components, one or more tasks specified in the another workflow for the saved report job.

14. The method of claim 13, wherein the workflow controller services receives the report execution request from a client application on the client terminal during a client session.

15. The method of claim 13, further comprising storing the new report job defined by the user, and wherein the workflow controller service receives the report execution request when the new report job is scheduled to be run.

16. The method of claim 13, further comprising sending, by the service components, status messages back to the workflow controller service.

17. The method of claim 16, further comprising sending a report status update to a client application on the client terminal.

18. The method of claim 13, wherein the report execution request from the client application includes a Simple Object Access Protocol (SOAP) Extensible Markup Language (XML) message;

* * * * *

UNITED STATES PATENT AND TRADEMARK OFFICE
CERTIFICATE OF CORRECTION

PATENT NO. : 7,647,423 B2  Page 1 of 1
APPLICATION NO. : 11/119008
DATED : January 12, 2010
INVENTOR(S) : Das et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 712 days.

Signed and Sealed this

Sixteenth Day of November, 2010

David J. Kappos
*Director of the United States Patent and Trademark Office*